United States Patent Office 3,081,714
Patented Mar. 19, 1963

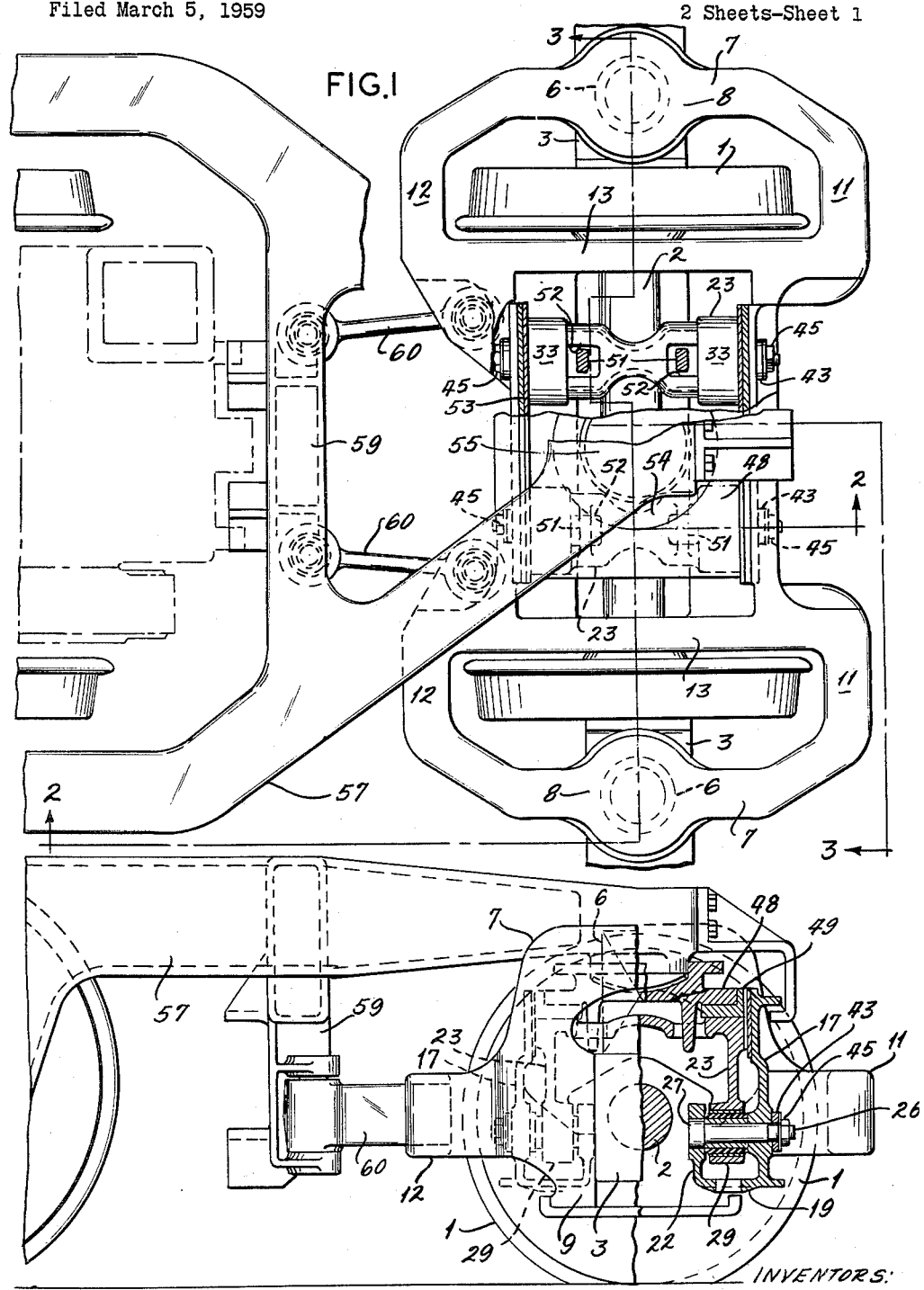

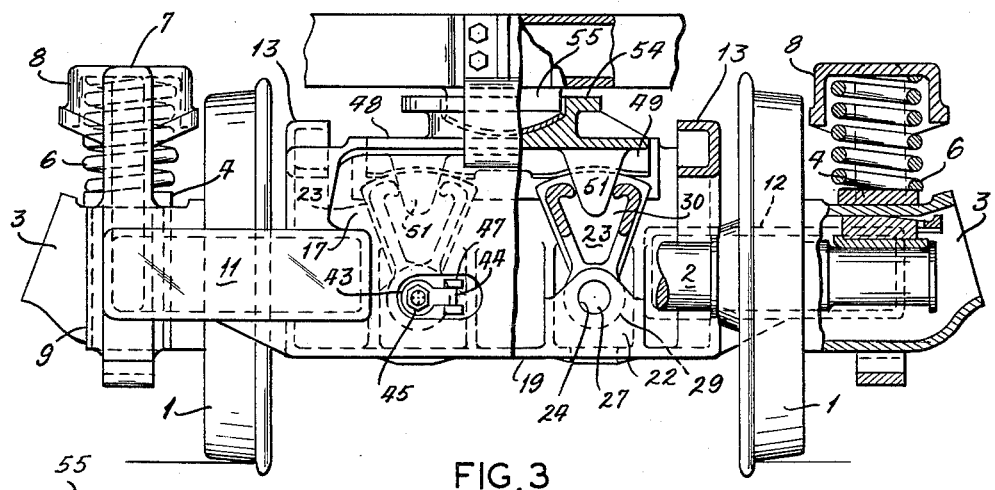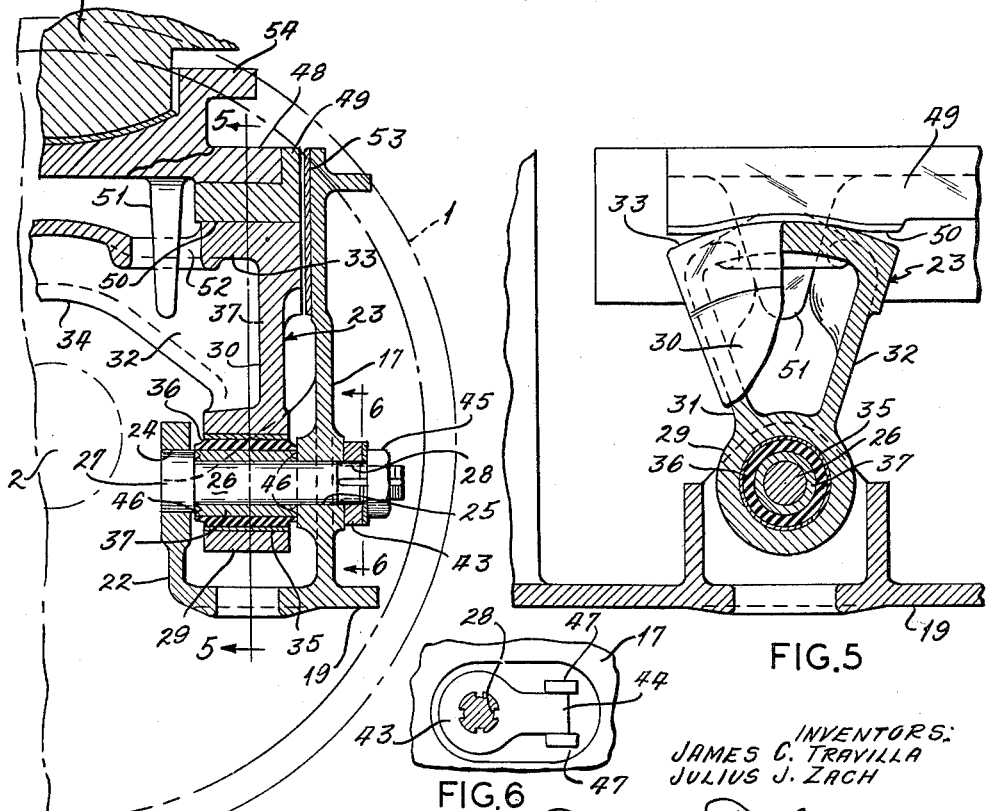

3,081,714
TWO-WHEEL RAILWAY TRUCK
James C. Travilla, Ladue, and Julius J. Zach, St. Louis Mo., assignors to General Steel Industries, Inc., a corporation of Delaware
Filed Mar. 5, 1959, Ser. No. 797,478
7 Claims. (Cl. 105—174)

The invention relates to railway rolling stock and consists particularly in an improved lateral centering device especially adapted for two-wheel locomotive trucks.

It is a principal object of the invention to provide a roller-type centering device for the lateral motion bolster of a railway truck, in which the yieldability and resistance in shear of rubber is utilized to permit rotation of the roller and to return the roller to its normal position.

It is a further object to provide a roller centering device from which bearings needing lubrication are eliminated and which are thus immune to fouling as a result of the accumulation of dirt and debris in the region of the bearings.

It is a further object to provide a roller centering device including rubber means for resisting displacement of the rollers from their normal positions, and means separate therefrom for providing substantially constant resistance throughout lateral movements of the bolster.

We achieve these and additional objects by mounting segmental rollers on rubber-bushed non-rotating pivot pins, and varying the curvature of the top bearing plates which are engageable with the top arcuate surfaces of the rollers so as to decrease resistance offered by the top bearing plates as the angular deflection and stiffness of the rubber bushings increases.

In the drawings FIGURE 1 is a plan view of a two-wheel engine truck incorporating our centering device, and the forward end of an associated motor truck.

FIGURE 2 is an elevational view corresponding to FIGURE 1 and partially sectionalized along the line 2—2.

FIGURE 3 is a transverse view along the line 3—3 of FIGURE 1.

FIGURE 4 is an enlarged longitudinal vertical sectional view corresponding to the sectionalized portion of FIGURE 2.

FIGURE 5 is a transverse vertical sectional view along the line 5—5 of FIGURE 4.

FIGURE 6 is a transverse vertical sectional view along the line 6—6 of FIGURE 4.

Referring now to the drawings, the two-wheel truck structure includes a pair of laterally-spaced flanged wheels 1 rigidly mounted on an axle 2, upon the ends of which are rotatably supported the usual journal boxes 3. Suitable spring seats 4, carried by journal boxes 3, mount upright coil springs 6, which support the wheel pieces 7 of the truck frame. Wheel pieces 7 surround each of the wheels, and each comprises longitudinally extending structure outboard of the wheels, including a pedestal 9 within which is vertically slidably received journal boxes 3, and, immediately above the pedestals, spring pockets 8, within which springs 6 are received. By means of transverse members 11 and 12 forwardly and rearwardly of the wheel, the outboard portion of each wheelpiece is connected to an inboard member 13 extending longitudinally of the truck and arching intermediate its end to clear axle 2. Inboard members 13 are connected to each other forwardly and rearwardly of the axle by a pair of transversely-extending transoms of substantially L-shaped cross section each comprising a transverse upright web 17 and a horizontal web 19 extending longitudinally of the truck toward the axle from each upright web 17.

The terminals of horizontal webs 19 nearest axle 2 are bent upwardly to form pairs of laterally-spaced upright transversely-extending brackets 22 which form, with longitudinally-aligned portions of upright webs 17, a pivot mounting for a pair of laterally-spaced rollers 23.

The brackets 22 and upright webs 17 at both sides of the axle are formed with aligned openings 24 and 25 to accommodate pivot pins 26. Pins 26 are each formed with an enlarged head 27 of substantially the same diameter as openings 24 and their opposite end portions are of slightly reduced diameter, being threaded near their outer extremity and fluted as at 28 inwardly therefrom.

Rollers 23 have end portions spaced apart longitudinally of the truck and each comprising a hub 29, a segmental plate 30 extending upwardly therefrom, a pair of angularly-spaced radial webs 31 and 32, and an arcuate top web 33 concentric with the hub axis. Radial webs 31 and 32 merge with each other between the end portions of each roller and are arched upwardly as at 34 to provide clearance thereunder for axle 2. The outer cylindrical metal sleeve 35, of an assembly including a rubber bushing 36 and an inner cylindrical metal sleeve 37, is press-fitted in each hub 29.

Rollers 23 are mounted in the truck frame by aligning the inner sleeves 37 with the aligned openings 24 and 25 in the frame, and inserting pins 26 in the registering openings from the direction of the axle. A circular plate 43, having a radially extending tongue 44 and a fluted opening corresponding to the fluted portion 28 of pivot pin 26, is mounted on the latter and is secured thereon by a nut 45, the tongue 44 of plate 43 being held against rotation by a pair of lugs 47 on the outer surface of upright webs 17 adjacent each of the pivot pin openings 25 thereon. With this arrangement, the fixed position of the pivot axes can be varied as desired by loosening the nuts 45, withdrawing plates 43 from the fluted portions 28 of pins 26, rotating pins 26 to the desired position, re-engaging plates 43 with the fluted portions of the pins, and tightening the nuts. The end surfaces of inner sleeves 37 are serrated, as at 46, so as to prevent rotation of sleeves 37 relative to the truck frame by frictional engagement, respectively, with the heads 27 of pins 26 and the inner surfaces of members 17. When the rollers are thus mounted some pivotal movements about their axes will be accommodated and yieldingly resisted, respectively, by the distortion in shear and the resistance thereto of rubber bushings 36.

A bolster 48 of rectangular shape in plan is provided with transversely-extending bearing plates 49 adjacent its forward and rear transverse edges. Each of the plates 49 is formed with a pair of transversely-spaced upwardly concave bearings 50, each terminating in horizontal surfaces at both sides. Bolster 48 is also provided with four depending teeth 51 which are received in apertures 52 in the tops of the rollers 23 to insure that bearings 50 and the top surfaces 33 of the rollers will be in proper relation with each other at all times. For preventing movements of the bolster longitudinally of the truck, while accommodating required vertical and lateral movements of the bolster, the inner surfaces of transverse upright frame webs 17 are provided with hardened steel wear plates 53 which are frictionally engageable with the opposing vertical surfaces of bearing plates 49.

Bolster 48 is provided with a spherical center plate 54 which is in load-supporting engagement with a mating center plate 55 on the forward end of a motor truck frame 57 and the frame of the two-wheel truck is connected to a forward transom 59 of the motor truck by a pair of transversely-inclined horizontal links 60 in a manner well-known in the art, so that the leading truck frame is free to move radially relative to the motor truck frame 57 during operation on curved track. The engagement of the center plates 54 and 55 prevents lateral movement of bolster 48 relative to the motor truck frame 57 and accordingly the bolster is required to move laterally relative to the frame of the two-wheel truck, its lateral movement being limited by engagement of the bolster ends with inside wheel piece elements 13. As this movement occurs, the rollers become tangent to the bearing 50 at lower points on the bearings, and the vertical distance between the bolster and the pivot axes of the rollers accordingly increases. Since the bolster is held at a substantially constant height by the weight of the locomotive structure supported by motor truck frame 57, the two-wheel truck frame will be urged downwardly on its springs 6, the restoring force of which tends to restore the frame to its normal height and the bolster to a laterally-centered position. At the same time, rotation of rollers 23 about their axes is resisted by the resistance of the rubber bushings 36 to shear, which also tends to restore the rollers to their normal positions.

The resistance offered by the centering device to lateral motion of the bolster and also its restorative force are the resultants of the slope of the bearings 50 and the stiffness or resistance of the rubber bushings in shear. Since the torsional stiffness of the bushings increases as their angular deformations increase, if uniformly inclined bearings were utilized, resistance of the device to lateral motion of the bolster would increase as the amplitude of the lateral motion increased. In order to compensate for such an increase in the torsional stiffness of the rubber bushings and thereby achieve a substantially constant resistance throughout the range of lateral bolster movement, the slope of bearings 50 is steepest at the points of tangency with the roller when the latter is in the centered position and is increasingly gradual on both sides of these points until each of the bearing surfaces becomes horizontal adjacent both its sides, the slope decreases as the stiffness of the rubber bushings increases becoming horizontal and thus offering no resistance to lateral movement of the bolster relative to the frame when the stiffness of the rubber is at a maximum; i.e., when the bolster reaches its extreme off-center position.

It will be understood that the lateral motion device described herein can be used readily with trucks of types other than the two-wheel engine truck described herein, and that the details of the structure may be varied substantially without departing from the spirit of the invention and the exclusive use of those modifications as come within the scope of the appended claims is contemplated.

What is claimed is:

1. In a railway vehicle truck, wheels, an axle, a frame resiliently supported from said axle, said frame mounting aligned cylindrical members extending longitudinally of the truck at either side of said axle, a pair of rubber-like annuli each surrounding one of said cylindrical members and held against rotation relative thereto, a pivoted member extending over said axle and having a pair of cylindrical openings each fixedly receiving one of said annuli, arcuate surfaces on said pivoted member and concentric with said cylindrical members, and a bolster normally centered laterally of said frame and extending over said axle and carried by and frictionally engaging said arcuate surfaces, said annuli being yieldable in torsional shear whereby to accommodate and yieldingly resist pivoting of said pivoted member about said cylindrical members responsive to forces tending to move the bolster laterally relative to the frame and to urge the bolster and pivoted member toward their normal centered position.

2. In a railway vehicle truck, wheels, an axle, a frame resiliently supported from said axle, said frame mounting laterally spaced pairs of aligned cylindrical members extending longitudinally of the truck, the members of each pair being at opposite sides of the axle, rubber-like annuli each surrounding one of said cylindrical members and held against rotation relative thereto, a pair of laterally spaced pivoted members each extending over the axle and having a pair of longitudinally spaced aligned openings each fixedly receiving the rubber annulus of one of said aligned cylindrical members, arcuate surfaces on said pivoted members and concentric with said cylindrical members, and a bolster normally centered laterally of said frame and extending over said axle and carried by and frictionally engaging said arcuate surfaces, said annuli being yieldable in torsional shear whereby to accommodate and yieldingly resist pivoting of said pivoted members about said aligned cylindrical members responsive to forces tending to move the bolster laterally of the frame and to urge the pivoted members and bolster toward their normal centered position.

3. In a railway vehicle truck, wheels, an axle, a frame resiliently supported from said axle and including members extending transversely of the truck forwardly and rearwardly of said axle, said frame transverse members each mounting, at a level lower than the top of the axle, one of a pair of cylindrical members aligned longitudinally of the truck, rubber-like annuli each surrounding each of said cylindrical members and held against rotation relative thereto, a pivoted member comprising end portions each having a cylindrical opening fixedly receiving one of said annuli and an arcuate top surface concentric with said cylindrical members and an intermediate portion connecting said end portions and being arched over said axle, and a bolster extending over said axle and carried by and frictionally engaging said arcuate surfaces, said bolster normally being centered laterally of said frame, said annuli being yieldable in torsional shear whereby to accommodate and yieldingly resist pivoting of said pivoted members about said cylindrical members responsive to forces tending to move the bolster laterally relative to the frame and to urge the pivoted members and bolster toward their normal centered position.

4. In a railway vehicle truck, wheels, an axle, a frame resiliently supported from said axle, said frame including transverse upright web structure spaced apart longitudinally of the truck and having aligned cylindrical openings and spaced bosses near one of said openings, a pin extending through said openings and having a head at one end and fluting adjacent its other end, said fluting extending outwardly from one of said upright transverse members, a tongued plate having an opening in registry with said fluting and a tongue normally positioned between and in engagement with said spaced bosses on said upright member, and means associated with said pin for retaining said plate in registry with said fluting and in engagement with said bosses whereby to prevent rotation of said pin relative to said transverse members, a rubber-like annulus carried by said pin and retained against rotation about said pin relative to said transverse members, a segmental member having a hub portion fixedly receiving said annulus and a top arcuate surface concentric with the axis of said pin, a bolster having a bearing in engagement with said arcuate surface, upright bearing surfaces on one of said transverse members engageable with an opposing vertical surface of said bolster for preventing movement of said bolster longitudinally of said truck while accommodating lateral movements of said bolster on said segmental member, said annulus being yieldable in torsional shear whereby to accommodate and yielding resist pivoting of said segmental member about said pin responsive to forces tending to move the bolster laterally relative to the frame, and to urge the segmental member and bolster toward their normal position.

5. In a railway vehicle, a truck comprising wheels, an axle, a frame resiliently supported from said axle and including members extending transversely of the truck forwardly and rearwardly of said axle, said frame transverse members each mounting, at a lower level than the top of the axle, one of a pair of cylindrical members aligned longitudinally of the truck, rubber-like annuli each surrounding each of said cylindrical members and held against rotation relative thereto, a pivoted member comprising end portions each having a cylindrical opening fixedly receiving one of said annuli and an arcuate top surface concentric with said cylindrical members and an intermediate portion connecting said end portions and being arched over said axle, a bolster extending over said axle and carried by and frictionally engaging said arcuate surfaces, said bolster mounting on its upper surface a spherical center plate, vehicle-supporting framing including a mating center plate in load-transmitting engagement with said bolster center plate, radius bar structure connecting said truck frame with said framing and accommodating relative radial movements therebetween in a horizontal plane responsive to curvature of the supporting track, said bolster normally being centered laterally of said frame, said annuli being yieldable in torsional shear whereby to accommodate and yieldingly resist pivoting of said pivoted members about said cylindrical members responsive to forces resulting from radial movements of said truck frame relative to said framing and tending to move the bolster laterally relative to said truck frame, the torsional stiffness of said annuli biasing the pivoted members and bolster toward their normal centered position and thereby to urge the forward end of said framing toward the center of track curvature.

6. In a railway vehicle truck, wheels, an axle, a frame resiliently supported from said axle and having portions extending transversely of the truck forwardly and rearwardly of said axle, a member pivoted on said portions on an axis extending longitudinally of the truck at a lower level than the top of said axle, said member comprising end portions forwardly and rearwardly of said axle each consisting of a segment of a cylinder concentric with said pivot axis and including said pivots and having its arcuate surface facing upwardly, said member also including an intermediate portion merging with end portions and arched over said axle whereby to clear said axle, a bolster having bearing surfaces spaced apart longitudinally of the truck and carried by and in frictional engagement with the longitudinally spaced arcuate surfaces of said pivoted member, said bolster normally being centered laterally of the truck and being laterally movable relative to the frame by rolling engagement between said bearing surfaces and said arcuate surfaces, the pivot for said member including torsionally resilient means having relatively movable portions fixed respectively to said frame and said member whereby to oppose pivoting of said member relative to said frame.

7. In a railway vehicle truck according to claim 6, there being a pair of said pivoted members spaced apart transversely of said truck and symmetrically disposed with respect to the longitudinal center line thereof.

References Cited in the file of this patent
UNITED STATES PATENTS

| | | |
|---|---|---|
| 1,207,056 | Kiesel | Dec. 5, 1916 |
| 1,486,661 | Hall | Mar. 11, 1924 |
| 1,676,259 | Getchell | July 10, 1928 |
| 1,884,801 | Meyer et al. | Oct. 25, 1932 |
| 2,592,637 | Ainsworth | Apr. 15, 1952 |
| 2,723,628 | Rossell | Nov. 15, 1955 |